Oct. 21, 1969  W. E. HUMPHREY  3,473,861
ACCIDENTAL-MOTION COMPENSATION FOR OPTICAL DEVICES
Filed July 10, 1967  2 Sheets-Sheet 1

INVENTOR.
WILLIAM E. HUMPHREY
BY
Lippincott, Ralls & Henderson
ATTORNEYS

United States Patent Office

3,473,861
Patented Oct. 21, 1969

3,473,861
ACCIDENTAL-MOTION COMPENSATION FOR
OPTICAL DEVICES
William E. Humphrey, Oakland, Calif., assignor to Optical
Research and Development Corporation, Oakland,
Calif., a corporation of California
Filed July 10, 1967, Ser. No. 652,325
Int. Cl. G02b 23/00, 23/02
U.S. Cl. 350—16         6 Claims

ABSTRACT OF THE DISCLOSURE

An optical stabilizer having an optical train including a two-power inverting telescope having optics within the telescope for retrodirecting the light beam to project a retrodirected collimated light beam in which stabilization of the image occurs by a reflecting element mounted within the collimated light beam.

---

The invention hereinafter disclosed and claimed is generally directed to the field of optical stabilization or accidental-motion compensation for optical systems. Specifically, the invention comprises a simple inverting telescope of approximately two power whose optical axis has been turned approximately 180° by an odd number of reflecting surfaces. The foregoing inverting telescope and reflecting surfaces thereof are fixed to a surrounding case of the optical system and direct light onto a system, or unit, having an odd number of reflecting surfaces and inertially stabilized within the case against "pitch" and "yaw" with respect to an original line-of-sight but not with respect to "roll" about such line-of-sight. Light reflected from the inertially-stabilized system, or unit, emerges substantially parallel to the light from the object being viewed and is stabilized relative to the case, so that it may then be employed either with optical-viewing devices or cameras.

BACKGROUND OF INVENTION

There has been developed a wide variety of optical stabilization systems which may be divided into a number of general categories for discussion. The first of these categories may be denominated as the stabilized-platform approach wherein an entire device, such as a camera or the like, is stabilized against motion by mounting thereof upon a gyroscopically-controlled platform, for example. Various difficulties with this approach to the problem are believed readily apparent, particularly the necessary physical size of the overall system. Another general category of optical stabilization systems includes those converting light into some other type of beams, such as electron beams, which may then be operated upon to insert corrections in the direction thereof for compensation of angular deviations of a housing from an original line-of-sight. While this later category of systems has certain advantages, it also necessarily incorporates a substantial complexity which makes devices thereof wholly unsuited for many applications. Another general category of optical stabilizers provides means such as a gyroscope to sense angular deviations of the device from an original line-of-sight and to force an optical element to move in such a way as to compensate for the error. These systems generally suffer from at least a difficulty such that complex and often times unworkable drive systems must be employed and certain basic limitations of gyroscopes or optics are compromised.

In addition to the foregoing, there have also been advanced certain inertial-stabilization systems disclosed, for example, in prior copending patent applications of the present inventor. Both refractive and reflective systems have been developed employing inertial stabilization of one or more elements of an optical train in order to automatically redirect light rays along the axis of the device housing during angular deviations of such housing from an original line-of-sight. Many of these systems are quite practical for a wide variety of applications. In particular, it is noted that the utilization of inertial stabilization has proven highly advantageous in the field of optical accidental-motion compensation.

SUMMARY OF INVENTION

The invention set forth below is of particular utility in the field of accidental-motion compensation. The invention avoids the mechanical and optical limitations of previous devices in the field of optical stabilization for both cameras and optical-viewing devices. In common with inertially-stabilized systems such as generally identified above, the present invention is adapted for utilization in all types of optical devices, including cameras, binoculars, telescopes and the like. With a very minimum of complexity and physical size, the present invention provides very high quality optics with the introduction of substantially no aberrations, while yet requiring only a minimum of precision in manufacture. High-power magnification is possible in optical systems employing the present invention because of the extremely good resolution obtained herein.

As briefly stated in the foregoing abstract, the present invention employs an inverting afocal telescope of approximately two power, together with an odd number of plane-reflecting surfaces, all maintained in fixed relation within a device housing, or case, and producing substantially parallel light directed substantially toward the object being viewed and with or without a displacement of the retrodirected parallel light rays. The invention additionally includes an inertially-stabilized element, preferably one or three reflecting surfaces. This element is inertially stabilized against angular deviations from an original line-of-sight, i.e., "pitch" and "yaw," but is not stabilized against "roll" about the original line-of-sight. There may also be employed in the present invention a gyroscope to assist in the inertial stabilization; furthermore, appropriate precessing means may be employed with such a gyroscope to thereby accommodate traverse of the optical device.

DESCRIPTION OF FIGURES

The invention is illustrated as to particular preferred embodiments thereof in the accompanying drawings wherein.

DESCRIPTION OF PREFERRED EMBODIMENTS

Figure 1:
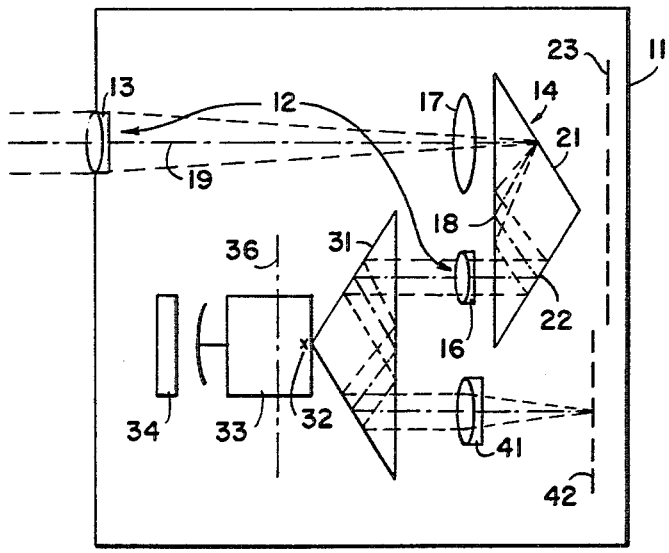
FIGURE 1 is a schematic illustration in line diagram form of one embodiment of the present invention.

One preferred embodiment of the present invention is illustrated in FIGURE 1 of the drawings and will be seen to incorporate a plurality of optical elements disposed within a light-tight case 11. The case 11 is hereinafter taken as a reference, particularly with respect to the direction it is pointed; furthermore, it is hereinafter assumed, unless otherwise stated, that the optical device constitutes a camera. Certain variations, or modifications, of optical stabilization are required for viewing devices, as compared to cameras, and this is discussed in some detail below.

Within the case 11 there is disposed an inverting afocal telescope of approximately two power and including an odd number of reflecting surfaces for retrodirecting incoming light substantially back toward the object being viewed. This telescope is generally indicated by the numeral 12 in FIGURE 1 and is illustrated as including an objective lens, or lenses, 13 disposed in a wall of the case in extension therethrough. The objective 13 will be seen to be rigidly affixed to the case; and within the case there is disposed a triple-reflecting element 14 which is also rigidly affixed to the case and in position to intercept light from the objective 13. This element 14 is illustrated as a prism in the embodiment of FIGURE 1; the general properties and alternative embodiments of such an element are discussed immediately below. The element 14 does serve to redirect, or retrodirect, the light back toward the object being viewed and adjacent the element 14 there is disposed a second lens, or lens group, 16. The lenses 13 and 16 together comprise an inverting afocal telescope of substantially two-power magnification and together with the element 14 direct light in parallel rays substantially toward the object being viewed. There may additionally be provided one or more field lenses 17 for concentrating light from the objective 13 into the lens unit 16 and such field lens 17 may be mounted immediately ahead of the reflecting element 14, between same and the objective 13. It is particularly noted that the telescope lenses 13 and 16, as well as the reflecting element 14 and field lens 17, are all rigidly affixed to the case 11.

The element 14 consists of an odd number of reflecting surfaces which may be physically embodied in a variety of different configurations. In the illustration of FIGURE 1, the element is a prism formed of glass or plastic, for example, having in side elevation the configuration of an isoscles triangle which may, if desired, be truncated. A front surface 18 of the prism faces the objective 13, so that light from the objective travelling along an illustrated axis 19 enters the prism for reflection from a first rear surface 21, inclined with respect to the front surface. Such light will then be seen to be internally reflected in the prism from the front surface 18 back onto a second rear surface 22, inclined with respect to the front surface, and hence reflected outwardly through the front surface to pass through the lines 16. The rear surfaces 21 and 22 are each inclined with respect to the front surface 18 of the prism at an angle substantially in the range of 15° to 45°. These limitations are generally prescribed by the necessity to avoid missing the front surface 18, and yet maintaining substantially total reflection at the front surface internally of the prism, while providing a desired displacement between incoming and outgoing light rays. It is convenient to consider the reflecting element 14 as a plane mirror having many of the properties of an effective mirroring surface, or plane, located at 23 behind the prism. Mathematical consideration of the prism establishes the foregoing to be the case, and thus it may be considered as though incoming light were reflected from this effective mirroring plane 23 but displaced a distance therealong from a point of incidence.

Figure 3:
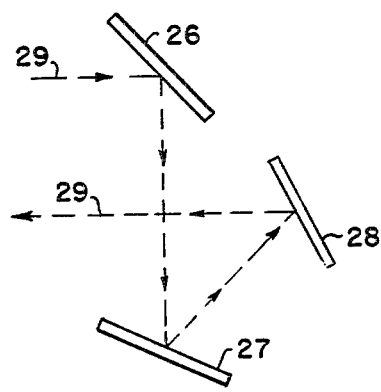
FIGURE 3 is a schematic illustration of one alternative triple-reflection element which may be employed in the present invention.

The particular triple-reflection element 14, illustrated in FIGURE 1, is only exemplary of a variety of units that may be employed in the present invention. One possible alternative to the prism 14 of FIGURE 1 is illustrated in FIGURE 3. In this instance, there are provided three plane mirrors 26, 27 and 28 rigidly affixed in position relative to each other, so that a light ray 29 striking the first reflecting surface, or mirror, 26 will be reflected to the second mirror 27 and thence to the third mirror 28, so as to be reflected therefrom back along a line substantially parallel to the incoming light ray 29 but displaced laterally therefrom. It is to be appreciated that the reflecting surfaces 26, 27 and 28 may be disposed in a variety of relative orientations; however, it is required in the embodiments of both FIGURES 1 and 3 that each of the reflecting surfaces has a line thereon which is parallel to a line on each of the other reflecting surfaces.

In addition to the inverting afocal telescope incorporating an odd number of reflecting surfaces so as to retrodirect light in parallel rays toward the object being viewed, the present invention includes an inertially-stabilized reflecting element 31. This element 31 may be physically comprised the same as the prism 14 of FIGURE 1 or alternative embodiments thereof discussed above, so that reflection with translation may be considered to occur from an effective mirroring plane 36. Inertial stabilization of the reflecting element 31 in "pitch" and "yaw" may be accomplished by pivotally mounting the element about two mutually perpendicular transverse axes, and, for convenience, a pivot point 32 is illustrated to be located near the apex of the prism 31. The pivot point 32 may be defined by the intersection of the mutually perpendicular pivot axes, although it is not necessary for these axes to actually intersect nor is it necessary for the element 31 to be pivoted about the apex thereof. In actuality, the pivot point, or axes, about which the element 31 is stabilized may be placed substantially anywhere within reason, so that the element 31 maintains original alignment in "pitch" and "yaw" with respect to incoming light thereto despite small angular motions of the case 11 in either horizontal or vertical direction. Inertial stabilization of the element 31 may be aided by the provision of a small gyroscope 33 affixed to the element 31 and movable therewith about the pivot 32. A free gyroscope is employed for enhancing inertial stabilization of the element 31, and a precessor 34 may be employed with this gyroscope. Characteristics of such precessor may be tailored for particular uses; and, in general, the precessor of FIGURE 1 operates to apply a force to the gyroscope in a direction which is at right angles to the desired direction of precession; in fact, the precessor may operate in quite a conventional manner, but may be provided with a "flat spot" in the characteristic curve of performance thereof to allow an angular range of compensation in which the precessor is ineffective. Consequently, the gyroscope is effective to improve inertial stabilization of the element 31 over some small predetermined range of angles. Upon exceeding this range of angular deviation, the precessor comes into operation to thereby cause the element 31 to traverse with the case 11. This movement of the reflecting element 31 with the case for angular deviations beyond the predetermined minimum is required for those instances wherein traverse, or panning, of an optical devices employing the present invention may occur. For example, in moving picture cameras, or optical devices such as binoculars or telescopes, it is often desired to follow a moving object or to photograph a panoramic view by movement of the optical device. The present invention provides for stabilizing images against small angular deviations from an original line-of-sight, as may occur through accidental motion of a case however, the invention does not prevent traverse, or panning, of an optical device employing the present invention.

As noted above, light emanates from the lens, or lens system, 16 of the telescope in parallel rays which are then directed upon the reflecting element 31 wherein an odd number of reflections are seen to occur by tracing a light path 19 therethrough, so that light emanating or reflected from the element 31 in parallel rays may be focused by a lens, or lens system, 41 upon a stabilized image plane 42. For camera applications, a film gate may be located at this image plane 42; however, for optical-viewing devices, the lens 41 directs light into an ocular system for viewing, as described in more detail immediately below.

Figure 2:
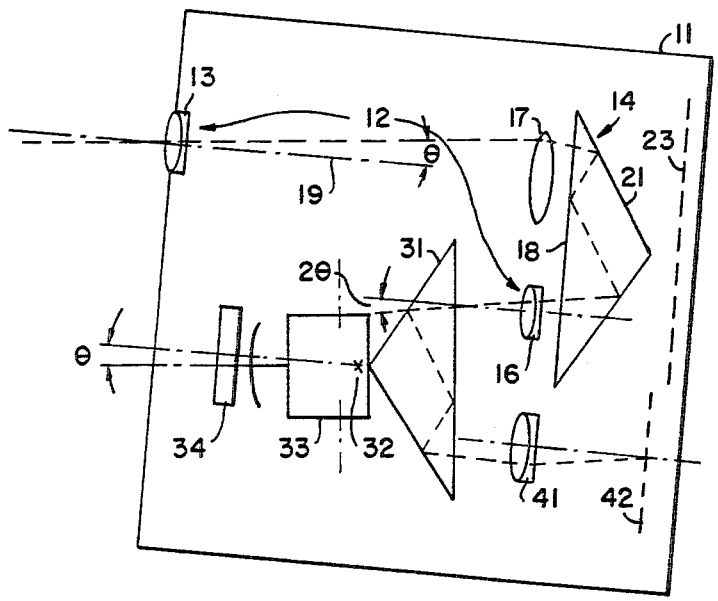
FIGURE 2 is an illustration of the embodiment of FIGURE 1 rotated through a small angle $\theta$, as may occur during use of the device and illustrating light paths therethrough.

In order to graphically illustrate the stabilization afforded by the present invention, reference is made to FIGURE 2 of the drawings. In this illustration the housing 11 will be seen to be shown to be tipped, or rotated, through a small angle $\theta$ with respect to horizontal. This angle is emphasized in the drawing purely for purposes of illustration, for in practical usage of optical devices, such as cameras, binoculars, telescopes and the like which may be hand-held, accidental-motion compensation is only required for angular vibrations or movements of relatively low order, such as a few degrees at the most. Assuming, as illustrated in FIGURE 2, that the housing has been rotated upwardly through an angle $\theta$, it will be seen that the inverting afocal telescope 12 and the triple-reflecting element 14 direct incoming light back toward the object but deflected from the original line-of-sight by an angle $\theta$. The stabilizing element 31 which is inertially stable maintains its orientation along the original line-of-sight. Consequently, the light entering the element 31 at an angle $\theta$ will leave with an angle $\theta$ which matches the rotation angle of the case, as shown in FIGURE 2. Therefore, light is reflected from the inertially-stabilized element 31 in the same direction with respect to the case as in FIGURE 1 to reach a stabilized image plane 42 in the same relationship as it does in the unrotated position of the housing of FIGURE 1. There has, consequently, been achieved a stabilization of the optics wherein an image is directed upon an image plane in exactly the same location whether or not the housing has been rotated through a small angle with respect to an original line-of-sight.

Considering the foregoing somewhat further, it will be appreciated that in practical usage of hand-held optical instruments, such as cameras and binoculars, it is almost certain that some movement of the device shall occur because of the unavoidable unsteadiness of the person holding the device. This unsteadiness is reflected in vertical or transverse angular deviations from an original line-of-sight or some combination of the foregoing. Insofar as the triple-reflecting element 14 is concerned, or the various alternatives thereof such as illustrated in FIGURE 3, it makes no difference whether or not the variations in angular orientation are vertical or horizontal. Insofar as the inertially-stabilized unit 31 is concerned, it is particularly noted that same is pivotally mounted about a two-dimensional pivot 32, i.e., about two perpendicular axes which are both substantially perpendicular to an original line-of-sight or axis of the folded inverted afocal telescope. Consequently, the illustrations of FIGURES 1 and 2 which relate only to vertical angular deviation from an original line-of-sight are equally applicable to horizontal deviations from an original line-of-sight. There is thus achieved by the present invention a true and highly practical optical stabilization of an image which is highly advantageous in the field of optics. It is to be particularly noted that light rays emanating from the afocal telescope 12 are substantially parallel, and that consequently various prior art limitations upon precise mounting and movement of elements are eliminated herein. Because the light rays are substantially parallel, they are each operated upon in the same manner by the active motion-compensation element of the system. It is further noted that the location of the exit pupil of the telescope is advantageously located for practical optical applications of the invention. The lens 16 of FIGURE 1 in the present invention operates upon a real image rather than a virtual image which allows the general size and subsequent elements herein to be materially improved over that available in the prior art. While it may be possible to optically stabilize images in a wide variety of ways, the present invention provides a very particular and important improvement thereover which departs materially from the teaching of the prior art and which, for the first time, truly solves a multitude of practical difficulties in the field.

Figure 4:
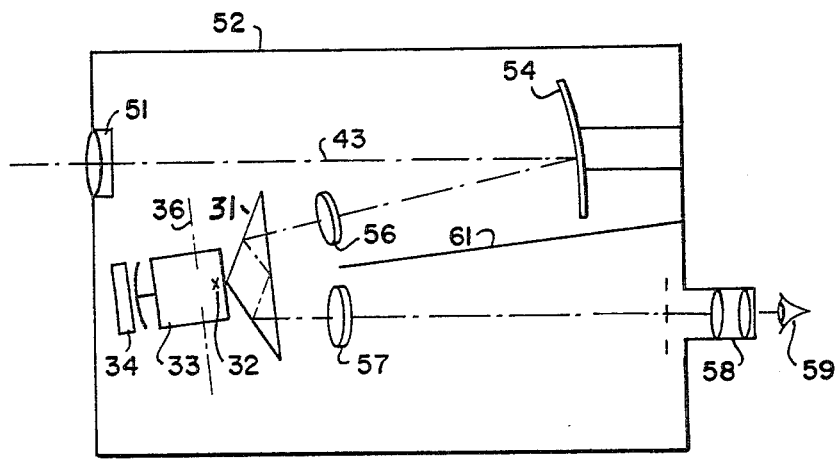
FIGURE 4 is a schematic illustration of an alternative embodiment of the present invention, particularly adapted to optical-viewing devices.

As described above, the folded afocal inverting telescope 12 producing parallel, or collimated, light is shown to comprise a multiplicity of lenses in combination with a reflecting element having an odd number of reflecting surfaces. This unit may be termed a collimator inasmuch as it does produce parallel light. It is noted to be additionally possible, in accordance with the present invention, to rearrange certain portions of the inverting telescope so as to provide reflections at positions at other than those shown in the specific example. Certain advantages may be attained by variations in the physical configuration. In a majority of optical stabilization applications such as binoculars, for example, it is highly advantageous to simplify the optics, and minimize cost, size, weight and power consumption. In this respect, reference is made to FIGURE 4 of the drawings wherein the folding of the inverting afocal telescope is illustrated as being performed by a curved reflecting surface. As shown in FIGURE 4, a first lens portion 51 of an inverting afocal telescope extends through a wall of a light-tight housing 52 to direct incoming light rays along a path 43 onto a curved reflecting surface 54 rigidly mounted within the housing. The curved reflected surface 54 may have both spherical and cylindrical curvatures. It is to be noted that the reflecting surface 54 accomplishes two very important tasks. First, it serves as a field element to collect light and, second, it corrects the normal curvature of field of the lenses 51 and 56. It is important that the element 54 be located near the real image to accomplish these tasks without introducing noticeable aberrations. It will be seen that the reflector 54 does not completely retrodirect light, but, instead, reflects it at some angle to the object being viewed. This light will be seen to pass through the remaining lens portion 56 of the afocal inverting telescope, and to be directed upon an inertially-stabilized reflecting element 31, such as described above. This element 31 is pivotally mounted about two mutually perpendicular axes which are substantially perpendicular to the axis of incoming light. The element 31 is shown to be pivotally mounted above a point 32 near the apex of the element; however, there are no restrictions on the placement of the pivot point relative to the prism. As illustrated in FIGURE 4, inertial stabilization of the element 31 may be assisted by a small gyroscope 33 having appropriate precessing means 34 associated therewith. It is to be appreciated that in this embodiment of the present invention, light emerging from the last element 56 of the inverting afocal telescope with reflection is comprised of substantially parallel light rays which are, however, directed at an angle downwardly within the housing by a reflection from the curved reflector 54. It is thus provided herein that the inertially-stabilized element 31 shall be initially disposed with the effective reflecting plane 36 thereof at an appropriate angle within the housing, so that the light is reflected from the element 31 substantially toward the rear of the housing. A lens, or lens system, 57 is illustrated to be provided within the housing for focusing light from the element 31 upon appropriate oculars 58 which may be mounted in extension through a rear wall of the housing, so as to direct a stabilized image upon an eye 59 of a viewer.

The emodiment of the present invention illustrated in FIGURE 4 will be seen to incorporate the same basic elements as the embodiment of FIGURE 1 described above. Thus, this embodiment of the invention also incorporates an inverting afocal telescope of substantially two power folded by an odd number of reflecting surfaces. Employed with the foregoing is an inertially-stabilized triple-reflecting element 31; thus, it is to be appreciated that operation of the embodiment of FIGURE 4 is substantially the same as that of FIGURE 1. In the particular configuration illustrated in FIGURE 4, it is desirable, and generally necessary, to provide means such as a light baffle 61 separating the incoming light from the exiting light. It will, of course, be appreciated that no light should be allowed to pass directly from the input opening in the housing to the output portion of the system, for any such light would be not stabilized and would interfere with the resultant image. It is also to be noted that for optical-viewing devices such as binoculars and telescopes there is required a slightly different stabilization than for cameras. In the instance of optics associated with cameras, it is desired to stabilize an image at a focal plane whereat light-sensitive film is adapted to be disposed. On the other hand, viewing of such a plane having an image stabilized thereat would not result in stabilization of the image to the viewer. This is treated further immediately below.

In order to emphasize certain properties of the present invention and noting that the triple-reflecting elements employed herein operate substantially as a plane mirror with translation between incident light and reflected light, it is to be appreciated that light is reflected therefrom at the same angle as the angle of incidence. Thus, a change in the angle of incidence equal to $\theta$ would result in a change $\theta$ in the angle of reflection, so that the overall effect of such a change in the angle of incidence would be $2\theta$ in reflection from the mirror. It thus follows that an inertially-stabilized plane mirror actually provides twice the angular deflection required to stabilize an image. The present invention provides for the utilization of an approximately two-power magnification in combination with the equivalent of the stabilized plane mirror, so as to obtain a change in the angle of reflection which is exactly equal to and opposite to a change in the angle of incidence of light. A magnification, such as employed herein, not only magnifies objects viewed, but, also, magnifies angular displacement thereof. More specifically, the angle with respect to the optic axis of the telescope, or the like, for a given deflection compensation $\theta$ is given by the relationship $$\Delta\theta = [P - 2(P-1)]\theta$$

where P is the power of the telescope. For applications such as cameras wherein it is desired to establish a stabilized image at a film plane, it is clear than that $\Delta\theta$ should be zero, consequently $P=2$. Specifically, this applies to the embodiment of the present invention illustrated in FIGURE 1 wherein the stabilized image plane 42 is adapted to have a film gate, or the like, located thereat. On the other hand, viewing devices such as telescopes, binoculars and the like require a modification of the stabilization. It is possible to derive the requisite modification from a careful consideration of optics involved, and the result is a modifying factor $$\left(1 \pm \frac{1}{M}\right)$$

which in the present instance is employed as a factor modifying the magnification power of the inverting afocal telescope 12. Thus, for viewing devices such as telescopes or binoculars, the inverting telescope 12 is herein provided with a power equal to $$2 \div \left(1 \pm \frac{1}{M}\right)$$

The term M is the magnification of the overall optical system employed for the present invention. In the foregoing modifying factor, it is noted that the plus sign is employed with an inverted image system and the minus sign with an erect image system. It is in the foregoing context that the term "approximately two-power magnification," or "substantially two-power magnification," is employed herein.

Further with regard to the embodiment illustrated in FIGURE 4 of the drawings, it is noted that incoming light is reflected by an odd number of reflecting surfaces, but at some small angle to the incoming light. Thus, the light is not entirely retrodirected but is only substantially so. This simplification of physical structure causes only a very slight reduction in quality which for most applications is quite tolerable. In particular, this embodiment is applicable for telescopes and binoculars. If desired, a single unit, such as schematically illustrated in FIGURE 4, may be employed in binoculars with appropriate optical means for directing light through two eyepieces, so that only a single accidental-motion compensator need be employed.

There have been described above two preferred embodiments of the present invention; however, it is noted that a variety of modifications thereof is possible. Insofar as the inverting afocal telescope with a folded light path is concerned, it is noted that the telescope lenses may well be positioned ahead of the odd number of reflecting surfaces, if desired, or between reflecting surfaces. Likewise, the field lens may be located any place in the optical path which is convenient and consistent with its function. It is particularly noted that the present invention overcomes certain prior art difficulties with requisite position and size of the exit pupil of the afocal telescope. By the utilization of an inverting telescope wherein the focal length of the second lens element is generally one-half the focal length of the first and the focal points of the two portions substantially coincide, it is possible to position the exit pupil of the telescope (by varying the strength of the field lens) a substantial distance therefrom inasmuch as the size of the bundle of stabilized light is minimized in the stabilized optics. This provides a material advantage insofar as the design of optical instruments is concerned. Also, the light travels in substantially the original line-of-sight as it leaves the stabilizing optics, simplifying the subsequent optics for most applications.

Considering the further various alternative locations of optical elements of the present invention, it is noted that incoming light may be first reflected before passing through the objective. In a system such as shown in FIGURE 3, the objective may be located between mirrors 26 and 27, if desired; further, the mirror 28 may be curved in the manner of element 54 of FIGURE 4 to concentrate light onto a second lens of the telescope that, in turn, provides substantially parallel light to an inertially-stabilized element of one or three reflecting surfaces. Variations such as the foregoing may be advantageously employed to tailor the light path for particular applications while yet following the teaching of the invention.

Although the present invention has been described and illustrated herein with respect to particular preferred embodiments, it is not intended to limit the invention by the terms of the description or details of illustration. Reference is made to the appended claims for a precise delineation of the true scope of this invention.

That which is claimed is:

1. An accidental-motion compensator for an optical system comprising: a housing, an approximately two-power, nonerecting telescope system mounted for rigid movement with said housing, said telescope system including optical means within said system positioned to receive the beam and retrodirect said beam in a direction substantially opposite the light beam entering said telescope, means including said telescope for projecting the retrodirected beam of collimated light from said system into said housing, reflecting means mounted in the path of said beam and positioned in the optical axis to reflect the collimated light from said beam in a direction displaced from the incoming beam from said telescope, said reflecting means being of the type wherein the angular deviation of the exiting rays is twice the angle of the incident ray with respect to the axis of the reflecting means, inertial means mounted to said reflecting means to maintain said reflecting means in a substantially fixed angular position in space irrespective of small angular variations of said housing, and optical means including an optical element mounted rigidly to said case in the path of said beam reflected from said reflecting means to form an image.

2. An accidental-motion compensator for an optical system as set forth in claim 1 further defined by said two-power nonerecting telescope having a magnification of $$2-\left(1-\frac{1}{M}\right)$$

wherein M is the overall magnification of the optical system and the sign of the relationship is plus for an inverting system and minus for an erecting system, and oculars extending through a housing wall in position to receive ligh directed thereon by said lens system located in the path of stabilized light.

3. An accidental motion compensator for an optical system comprising: a housing, an approximately two-power, nonerecting telescope system mounted for rigid movement with said housing, said telescope system including optical means within said system positioned to receive the beam and retrodirect said beam in a direction substantially opposite the light beam entering said telescope, means including said telescope for projecting the retrodirected beam of collimated light from said system into said housing, a triple reflecting element disposed to receive the incident projected beam from said telescope and to reflect a beam displaced and parallel to the incident beam, said triple reflecting element comprising three mirrored surfaces arranged at angles to reflect the light in a manner corresponding to a plane mirror disposed at a reflecting mirrored plane displaced between incident and reflecting light beams, inertial means mounted to said triple reflecting element constructed and arranged to maintain said reflecting element in a substantially fixed angular position in space irrespective of small angular variations of said housing, and optical means including an optical element mounted rigidly to said case in the path of the reflected light beam from said triple reflecting element to form an image.

4. An accidental motion compensator for an optical system as set forth in claim 3 further defined by said optical means of said telescope system being formed by an odd numbered reflecting element having optical reflectance angles of a reflecting plane.

5. An accidental motion compensator for an optical system as set forth in claim 3 being further defined by the optical means of said telescope system being formed of a single curved reflecting surface.

6. An accidental motion compensator for an optical system as set forth in claim 3 further defined by said inertial means comprising a gyroscope.

References Cited

UNITED STATES PATENTS

| | | |
|---|---|---|
| 2,944,783 | 7/1960 | Macleisch et al. |
| 2,906,161 | 9/1959 | Thompson. |
| 3,026,620 | 3/1962 | Rantsch. |

DAVID SCHONBERG, Primary Examiner

P. R. GILLIAM, Assistant Examiner